United States Patent
Woods et al.

(10) Patent No.: US 11,958,216 B2
(45) Date of Patent: Apr. 16, 2024

(54) MODULAR TOOLING SYSTEMS AND METHODS

(71) Applicant: ROHR, INC., Chula Vista, CA (US)

(72) Inventors: Jeffrey D. Woods, Beaumont, CA (US); Roberto Ramos, Moreno Valley, CA (US); Javier Lacalle, San Diego, CA (US); Andrew Adan, Corona, CA (US)

(73) Assignee: ROHR, INC., Chula Vista, CA (US)

( * ) Notice: Subject to any disclaimer, the term of this patent is extended or adjusted under 35 U.S.C. 154(b) by 65 days.

(21) Appl. No.: 17/554,856

(22) Filed: Dec. 17, 2021

(65) Prior Publication Data

US 2023/0191664 A1   Jun. 22, 2023

(51) Int. Cl.
*B29C 33/30*  (2006.01)
*B29C 33/38*  (2006.01)
*B29C 70/46*  (2006.01)
*B29L 7/00*   (2006.01)

(52) U.S. Cl.
CPC ............ *B29C 33/301* (2013.01); *B29C 33/38* (2013.01); *B29C 70/46* (2013.01); *B29L 2007/002* (2013.01)

(58) Field of Classification Search
CPC ...... B29C 33/301; B29C 33/38; B29C 33/302
USPC ......................................................... 156/60
See application file for complete search history.

(56) References Cited

U.S. PATENT DOCUMENTS

| | | | |
|---|---|---|---|
| 4,156,516 A | * | 5/1979 | Oliver ...................... A21B 3/15 |
| | | | 426/515 |
| 10,105,938 B2 | | 10/2018 | Guittard et al. |
| 10,322,525 B1 | * | 6/2019 | Smith ..................... E01C 19/52 |
| 10,815,546 B2 | | 10/2020 | Guichard et al. |
| 2004/0032043 A1 | | 2/2004 | Woolford et al. |
| 2021/0237370 A1 | | 8/2021 | Robbins et al. |

FOREIGN PATENT DOCUMENTS

| | | |
|---|---|---|
| EP | 3023234 | 1/2020 |
| FR | 1476837 | 4/1967 |

OTHER PUBLICATIONS

GooglePatents machine-translation to English of DE-102011077468-A1, with copy of foreign patent added; Schindlbeck M; Dec. 2012. (Year: 2012).*
European Patent Office, European Search Report dated May 9, 2023 in Application No. 22210024.0.

* cited by examiner

*Primary Examiner* — S. Behrooz Ghorishi
*Assistant Examiner* — Gregory C. Grosso
(74) *Attorney, Agent, or Firm* — SNELL & WILMER L.L.P.

(57) ABSTRACT

A modular tooling arrangement includes a base member comprising a planar working surface, a frame circumscribing a first cavity at least partially defined by the planar working surface, and a plurality of plates configured to be received in the first cavity for forming a second cavity of a desired shape and size. The plurality of plates at least partially define the second cavity configured to receive a work piece. The plurality of plates may be replaced with plates of various sizes to vary at least one of the size and shape of the second cavity.

15 Claims, 3 Drawing Sheets

MODULAR TOOLING SYSTEMS AND METHODS

FIELD

The present disclosure relates generally to the fabrication of composite laminates and more specifically to systems, methods, and tooling for consolidating composite laminates.

BACKGROUND

Consolidation of thermoplastic sheets into solid, substantially flat panels of useful thicknesses for use as structural panels and the like has been achieved inside heated autoclaves under pressure or on heated platen presses. Such panels are useful in the aircraft industry because they have strength and weight characteristics superior to aluminum and at the same time can be machined by longstanding methods applicable to aluminum which has been used extensively in the manufacture of aircraft.

SUMMARY

A modular tooling arrangement is disclosed, comprising a base member comprising a planar working surface, a frame circumscribing a first cavity at least partially defined by the planar working surface, and a plurality of plates configured to be received in the first cavity for forming a second cavity of a desired shape and size. Outwardly facing sides of the plurality of plates are configured to abut the frame. Inwardly facing sides of the plurality of plates at least partially define the second cavity configured to receive a work piece.

In various embodiments, the modular tooling arrangement further comprises a press member configured to compress the work piece between the planar working surface and the press member.

In various embodiments, the base member is made from a metal material.

In various embodiments, the frame is made from a metal material.

In various embodiments, the plurality of plates are made from a metal material.

In various embodiments, the frame comprises a plurality of frame members coupled to the base member.

In various embodiments, the first cavity is at least partially defined by inwardly facing sides of the frame.

In various embodiments, the press member is configured to be at least partially received into the second cavity.

In various embodiments, the modular tooling arrangement further comprises a seal configured to be seated around a perimeter of the second cavity.

In various embodiments, the seal is configured to be disposed between the work piece and the plurality of plates.

A modular tooling arrangement is disclosed, comprising a base member comprising a planar working surface, a frame coupled to the base member, the frame circumscribing a first cavity at least partially defined by the planar working surface, a first plurality of plates configured to be received at least partially into the first cavity so as to form a second cavity, and a seal. Outwardly facing sides of the first plurality of plates are configured to abut the frame. Inwardly facing sides of the first plurality of plates at least partially define the second cavity. The seal is configured to be received at least partially into the second cavity. The seal is configured to abut the inwardly facing sides.

In various embodiments, the seal comprises a fiber material.

In various embodiments, the modular tooling arrangement further comprises a second plurality of plates configured to replace the first plurality of plates so as to form a third cavity, wherein the third cavity is a different size and/or shape from that of the second cavity.

In various embodiments, the modular tooling arrangement further comprises a press member configured to be received at least partially into the second cavity.

In various embodiments, the press member is configured for reciprocal linear movement with respect to the base member.

In various embodiments, the first plurality of plates are floatingly coupled to the base member.

A method for consolidating a thermoplastic laminate is disclosed, the method comprising moving a first plurality of plates into a first cavity defined by a working surface of a base member and inwardly facing surfaces of a frame coupled to the base member, wherein inwardly surfaces of the first plurality of plates and the working surface define a second cavity, moving a seal into the second cavity, wherein the seal abuts the inwardly facing surfaces of the first plurality of plates, moving the thermoplastic laminate into the second cavity, wherein the seal is disposed between the thermoplastic laminate and the inwardly facing surfaces of the first plurality of plates, applying heat to the thermoplastic laminate, and compressing the thermoplastic laminate between a press member and the working surface.

In various embodiments, compressing the thermoplastic laminate includes moving the press member at least partially into the second cavity.

In various embodiments, the method further comprises cooling the thermoplastic laminate, and removing the press member from contact with the thermoplastic laminate.

In various embodiments, the method further comprises removing the first plurality of plates from the first cavity, and moving a second plurality of plates into the first cavity, wherein inwardly surfaces of the second plurality of plates and the working surface define a third cavity of a different dimension from that of the second cavity.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
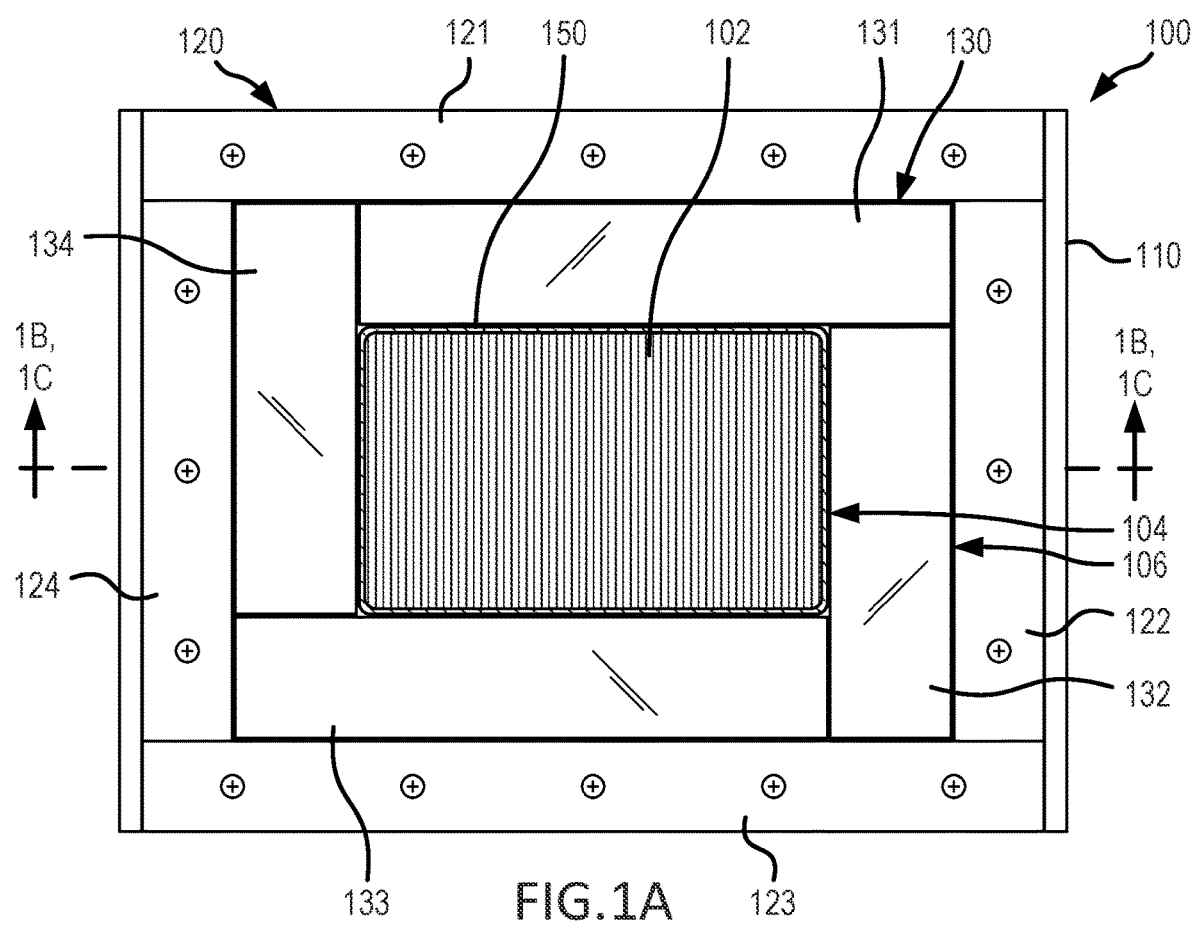
FIG. 1A illustrates a top view of a modular tooling arrangement, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Laminate consolidation can be performed using a platen press. As for laminated panels formed on a press, the platen size limits the size of panels which can be produced. More particularly, in order to consolidate laminates of different sizes, a new tool is provided that matches the desired laminate size and shape. In this regard, switching between laminates of different sizes tends to be cumbersome and requires new tooling to be manufactured or multiple presses having tooling configured for different size pieces. The foregoing deficiencies of the current practices leave much to be desired in filling the needs of high productivity, especially in the aircraft industry. Because of the ever-growing use of thermoplastic panels in structural applications to airplane manufacture, a faster, less expensive, and more reliable and efficient means for forming these panels especially in various sizes has become important.

A modular tooling system of the present disclosure includes a thermoplastic consolidation flat panel tool with modular inserts for building multiple size laminates, in accordance with various embodiments, using only one master tool. A modular tooling system of the present disclosure enables the consolidation of different size laminates on a press while utilizing less tooling. A modular tooling system of the present disclosure enables the use of only a single (i.e., one) master tool for different size laminates. A modular tooling system of the present disclosure tends to reduce cost for tooling. A modular tooling system of the present disclosure tends to reduce cycle time for tooling changeover.

With reference to FIG. 1A, a modular tooling system 100 (also referred to herein as a "modular tooling arrangement" and/or simply as "system") is illustrated for manufacturing a work piece 102 (also referred to herein as a laminate) of various shapes and sizes, in accordance with various embodiments. System 100 includes a generally planar base member 110 with a frame 120 fixed to the base member 110 for forming a fixture onto which a plurality of plates 130 of various shapes and sizes may be placed for forming a cavity or depression 104 (also referred to herein as a second cavity) of a desired shape and/or size into which the laminate 102 may be placed during a consolidation process.

In various embodiments, base member 110 may comprise a metal plate suitable for withstanding high temperatures experienced by system 100 during the consolidation process, such as a stainless steel plate or a mild steel plate for example. Base member 110 may have a working surface 112 onto which laminate 102 is received. Working surface 112 may be planar. Working surface 112 may be smooth. Base member 110 may comprise a rectangular geometry. Working surface 112 may comprise a rectangular geometry.

In various embodiments, frame 120 may comprise one or more members (e.g., frame member 121, frame member 122, frame member 123, and frame member 124) circumscribing a cavity or depression 106 (also referred to herein as a first cavity) into which the plurality of plates 130 may be placed. In this regard, the bottom surface of cavity 106 is working surface 112. Plates 130 may be placed loosely within cavity 106 (i.e., without fasteners, adhesive, or the like). In this regard, plates 130 may be floatingly coupled to base member 110 wherein the plates 130 merely rest on working surface 112 without being rigidly attached thereto. In this regard, plates 130 may be limited in lateral movement only by mechanical interference with frame 120 and/or one another. Plates 130 may be mechanically locked—by mechanical interference from the adjacent components—from lateral movement after all components are installed onto based member 110 depending on the particular configuration of the plates 130. Each frame member 121, 122, 123, 124 may comprise a metal plate suitable for withstanding high temperatures experienced by system 100 during the consolidation process, such as a stainless steel plate for example. Cavity 106 may be at least partially defined by inwardly faces sides or edges 126 of frame members 121, 122, 123, 124. Frame 120 may extend or protrude from working surface 112.

In various embodiments, the plurality of plates 130 (e.g., plate 131, plate 132, plate 133, and plate 134) may circumscribe a cavity or depression 104 into which laminate 102 may be placed. Each plate 131, 132, 133, 134 may comprise a metal plate suitable for withstanding high temperatures experienced by system 100 during the consolidation process, such as a stainless steel plate for example. Cavity 104 may be at least partially defined by inwardly facing sides or edges 136 of plates 131, 132, 133, 134. Outwardly facing sides or edges 138 of plates 131, 132, 133, 134 may abut one or more frame members 121, 122, 123, 124. In this manner, frame members 121, 122, 123, 124 may secure plates 131, 132, 133, 134 from moving outwardly (i.e., away from laminate 102) during the consolidation process. Plates 130 may extend or protrude from working surface 112 when installed onto base member 110.

In various embodiments, laminate 102 may comprise a plurality of fiber reinforced fabric sheets impregnated with a thermoplastic resin. These sheets may be stacked together to form laminate 102. The reinforcing fiber to be used for laminate 102 has no particular limitations with respect to the type thereof, and examples thereof include metal fibers, carbon fibers, glass fibers, etc. The thermoplastic resin to be used for laminate 102 has no particular limitations with respect to the type thereof, and examples thereof include polyarylene sulfide, polyketone (PK), polyetherketone (PEK), polyether ether ketone (PEEK), polyether ketone ketone (PEKK), polyaryletherketone (PAEK), polyimide (PI), polyamide imide (PAD, polyetherimide (PEI), polysulfone (PSU), polyarylate (PAR), etc.

In various embodiments, system 100 further includes a seal 150 disposed around the perimeter of laminate 102. Seal 150 may abut the inwardly facing sides 136 of plates 130. Seal 150 may be flexible. Seal 150 may comprise a material configured to withstand the high temperatures (e.g., 400° C. (752° F.) or more) experienced during the consolidation process. In various embodiments, seal 150 comprises a fiber material, such as glass fibers or other temperature resistant fibers for example. However, it is contemplated herein that seal 150 may comprise other high temperature materials, such as a high temperature silicone, rubber, foam, etc. In various embodiments, seal 150 may comprise a temperature resistant coating (e.g., polyimide film). In various embodiments, seal 150 extends around the entire perimeter of laminate 102 to help contain resin from laminate 102 within cavity 104, particularly during the consolidation process when the resin melts. Seal 150 may form a full loop around laminate 102. In this regard, seal 150 may prevent melted resin from laminate 102 from flowing outside cavity 104. In this manner, seal 150 may be disposed between laminate 102 and the plurality of plates 130.

Figure 1B:
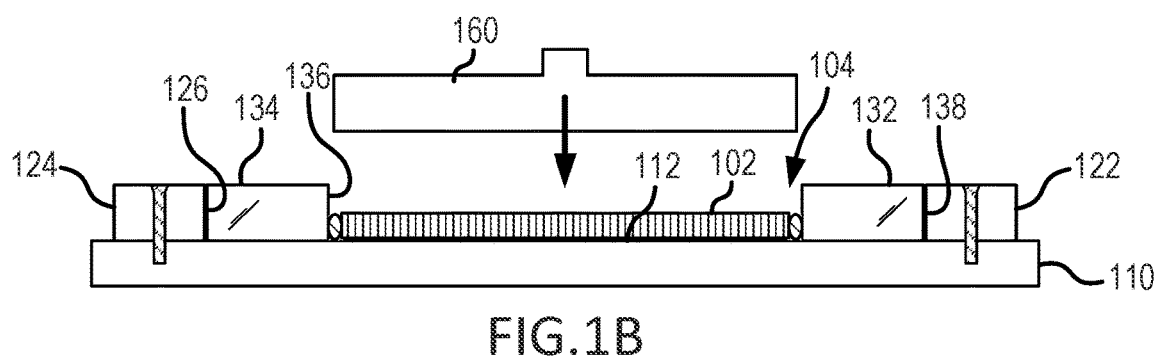
FIG. 1B illustrates a section view of the modular tooling arrangement of FIG. 1A with a press member in an open position, in accordance with various embodiments.
Figure 1C:
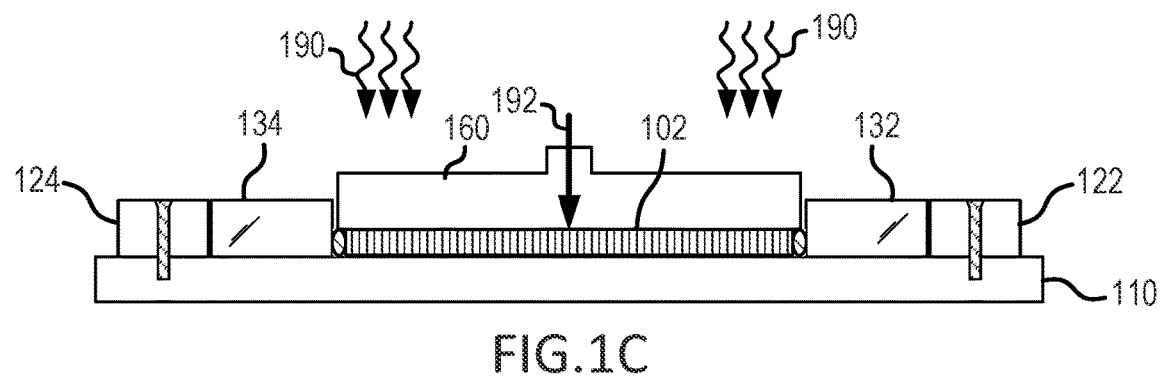
FIG. 1C illustrates a section view of the modular tooling arrangement of FIG. 1A with the press member in a closed, compressing position, in accordance with various embodiments.

With combined reference to FIG. 1B and FIG. 1C, during the consolidation process, a press member 160 may be moved toward laminate 102 and apply a force, illustrated by arrow 192, onto laminate 102. Press member 160 may be a tool configured to be received at least partially into cavity 104 for applying a force to laminate 102. Simultaneously, heat, as illustrated by arrows 190, is applied to laminate 102. Heat 190 may be applied by placing system 100 into an oven or autoclave and/or by a heated platen press (e.g., press member 160 and base member 110 may be configured as a heated platen press). For example press member 160 and/or base member 110 may be heated by steam, thermal oil, electrically heated, gas heating, etc. Press member 160 may be coupled to a hydraulic press or an electro-mechanical press suitable for applying a controlled force (and pressure) to laminate 102. Press member 160 may be configured for reciprocal linear movement with respect to base member 110. Press member 160 may comprise a geometry complimentary to that of cavity 104. Press member 160 may be sized slightly smaller than cavity 104 such that a small gap exists between press member 160 and the inwardly facing sides 136 of plates 130 (see FIG. 1C). In this regard, plates 130 do not mechanically interfere or block press member 160 from compressing laminate 102. Laminate 102 may be heated to a high temperature, such as up to 700° Fahrenheit (371° C.) or more for example. As laminate 102 is both heated and compressed between base member 110 and press member 160, resin in laminate 102 melts and the laminate plies consolidate into a single, unitary, fiber-reinforced thermoplastic member.

During the consolidation process, the surrounding components (e.g., base member 110, frame members 120, and plates 130) may also be heated which may cause cavity 104 to expand via thermal expansion. Conversely, after the resin reaches a predetermined temperature (or temperature range), the heat may be removed and the consolidated laminate 102 may begin to cool down to room temperature which may cause cavity 104 to reduce in size from thermal contraction of the system 100. However, the consolidated laminate 102 may remain the same size (i.e., does not thermally contract) as the system 100 cools. In addition to providing a sealing function, seal 150 may be further configured to accommodate this thermal expansion and contraction of system 100 around laminate 102 during the consolidation process. For example, seal 150 may be compressed between plates 130 and laminate 102 as the plates 130 thermally contract during the cooling step. Stated differently, the gap between laminate 102 and plates 130 may become smaller as the plates 130 cool down and the seal 150 may be compressed between consolidated laminate 102 and plates 130 in response thereto. In this manner, seal 150 may be configured to change in geometry (i.e., flex and/or compress) to accommodate this movement of plates 130 to prevent what would have otherwise been strain forces imparted into consolidated laminate 102 due to being squeezed between plates 130 as plates 130 thermally contract.

Figure 2:
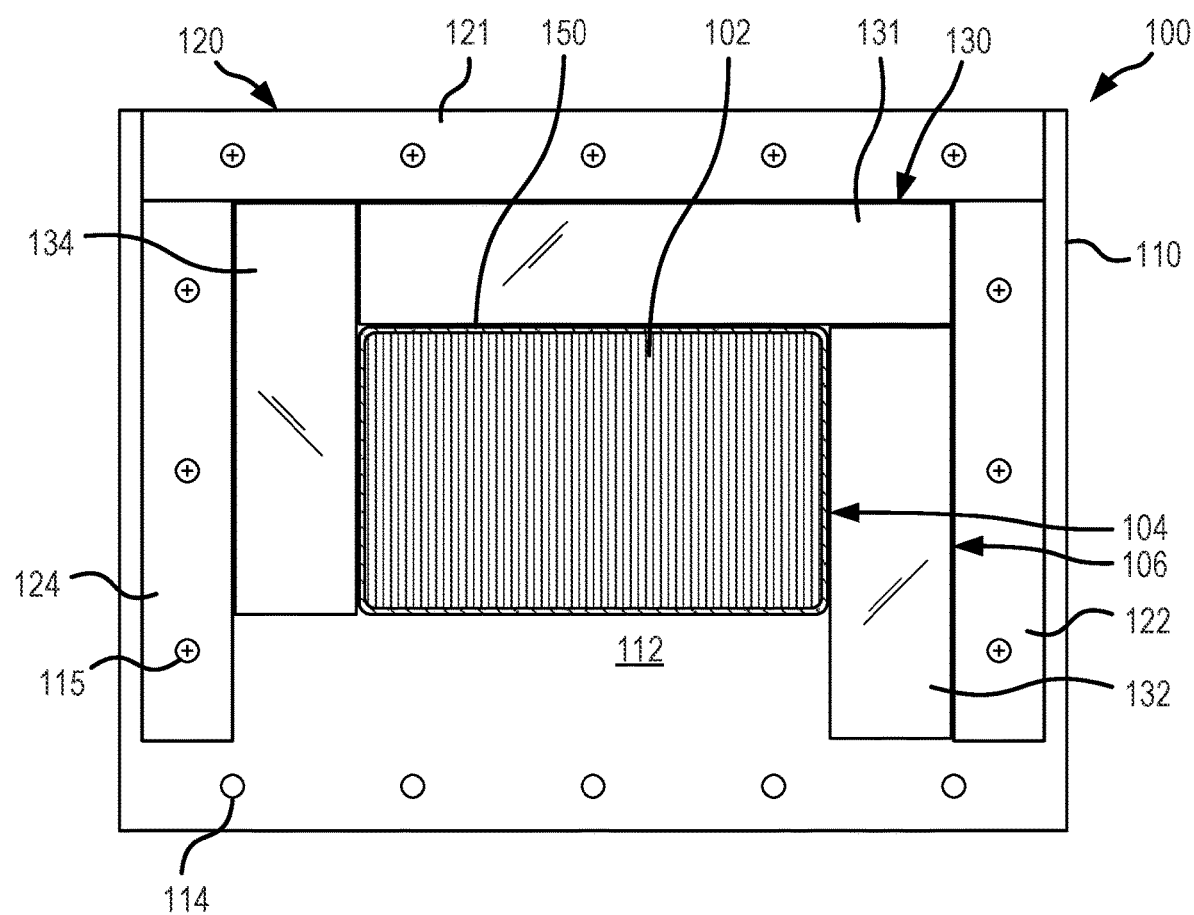
FIG. 2 illustrates a top view of the modular tooling arrangement of FIG. 1A with a frame member and a plate removed, in accordance with various embodiments.

With reference to FIG. 2, system 100 is illustrated with plate 133 and frame member 123 removed for clarity purposes and to more clearly show a top view of working surface 112 onto which plate 133 and frame member 123 are otherwise installed. Base member 110 may include apertures 114 for receiving fasteners 115 (e.g., bolts or screws) for securing the frame members 120 to base member 110.

Figure 3:
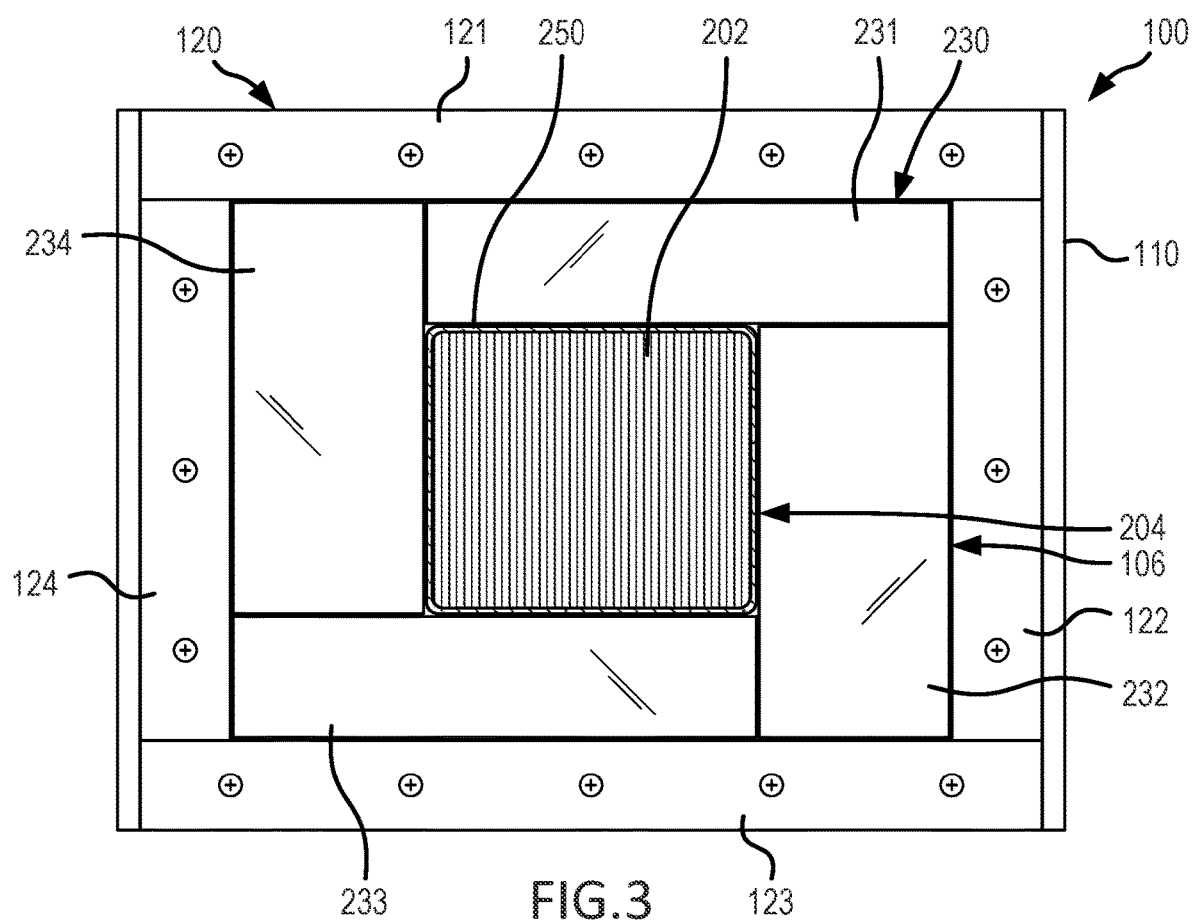
FIG. 3 illustrates a top view of the modular tooling arrangement of FIG. 1A with the first plurality of plates replaced with a second plurality of plates, the first seal replaced with a second seal, and the first laminate replaced with a second laminate of a different shape and size, in accordance with various embodiments.

With respect to FIG. 3, elements with like element numbering, as depicted in FIG. 1, are intended to be the same and will not necessarily be repeated for the sake of clarity.

With reference to FIG. 3, system 100 is illustrated with a plurality of plates 230 installed into cavity 106 which are different in size and geometry from plates 130 (see FIG. 1A). By installing plates 230 (e.g., plate 231, plate 232, plate 233, and plate 234), the size and/or geometry of cavity 204 (also referred to herein as a third cavity) may be varied with respect to cavity 104 (see FIG. 1A). It may be desirable to consolidate laminates of various shapes and sizes. In this regard, the shape and/or geometry of cavity 204 may be varied by replacing plates 230 to form the desired shape and/or geometry. In this manner, a laminate 202 of a different shape and/or size from that of laminate 102 (see FIG. 1A) may be consolidated. Moreover, a seal 250 of a different shape and/or size from that of seal 150 (see FIG. 1A) may be placed into cavity 204 to closely conform to the shape and size of laminate 202. In this regard, a common master tool (i.e., base member 110 and frame 120) is configured for use with various plates 230 for consolidating laminates of various shapes and sizes. In various embodiments, the press member (e.g., press member 160 of FIG. 1B) may be replaced with a second press member having a geometry which is complementary to the geometry of second cavity 204.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A modular tooling arrangement, comprising:
    a base member comprising a planar working surface;
    a frame circumscribing a first cavity at least partially defined by the planar working surface; and
    a plurality of plates configured to be received in the first cavity for forming a second cavity, wherein outwardly facing sides of the plurality of plates are configured to abut the frame, inwardly facing sides of the plurality of plates at least partially define the second cavity configured to receive a work piece, and the plurality of plates are floatingly coupled to the base member.

2. The modular tooling arrangement of claim 1, further comprising a press member configured to compress the work piece between the planar working surface and the press member.

3. The modular tooling arrangement of claim 1, wherein the base member is made from a metal material.

4. The modular tooling arrangement of claim 1, wherein at least one of the frame or the plurality of plates is made from a metal material.

5. The modular tooling arrangement of claim 1, wherein the frame is fixed to the base member with a plurality of fasteners.

6. The modular tooling arrangement of claim 1, wherein the frame comprises a plurality of frame members coupled to the base member.

7. The modular tooling arrangement of claim 1, wherein the first cavity is at least partially defined by inwardly facing sides of the frame.

8. The modular tooling arrangement of claim 2, wherein the press member is configured to be at least partially received into the second cavity.

9. The modular tooling arrangement of claim 1, further comprising a seal configured to be seated around a perimeter of the second cavity.

10. The modular tooling arrangement of claim 9, wherein the seal is configured to be disposed between the work piece and the plurality of plates.

11. A modular tooling arrangement, comprising:
    a base member comprising a planar working surface;
    a frame coupled to the base member, the frame circumscribing a first cavity at least partially defined by the planar working surface;
    a first plurality of plates configured to be received at least partially into the first cavity so as to form a second cavity, wherein outwardly facing sides of the first plurality of plates are configured to abut the frame, inwardly facing sides of the first plurality of plates at least partially define the second cavity, and the first plurality of plates are floatingly coupled to the base member; and
    a seal configured to be received at least partially into the second cavity, the seal configured to abut the inwardly facing sides.

12. The modular tooling arrangement of claim 11, wherein the seal comprises a fiber material.

13. The modular tooling arrangement of claim 11, further comprising a second plurality of plates configured to replace the first plurality of plates so as to form a third cavity, wherein the third cavity is at least one of a different size and a different shape from that of the second cavity.

14. The modular tooling arrangement of claim 11, further comprising a press member configured to be received at least partially into the second cavity.

15. The modular tooling arrangement of claim 14, wherein the press member is configured for reciprocal linear movement with respect to the base member.

* * * * *